United States Patent
Choi et al.

(10) Patent No.: US 10,495,893 B2
(45) Date of Patent: Dec. 3, 2019

(54) HARDWARE SYSTEM FOR INPUTTING 3D IMAGE IN FLAT PANEL

(71) Applicants: CellVic Co., Ltd., Suwon-si (KR); STI CO., LTD., Anseong-si (KR)

(72) Inventors: Byung-Moo Choi, Suwon-si (KR); Yong-Seok Jin, Pyeongtaek-si (KR); Jong-In Noh, Anseong-si (KR); Kwang-Hwan Kim, Cheonan-si (KR)

(73) Assignees: CELLVIC CO., LTD., Suwon-si (KR); PNST CO., LTD., Yongin-si (KR)

( * ) Notice: Subject to any disclaimer, the term of this patent is extended or adjusted under 35 U.S.C. 154(b) by 0 days.

(21) Appl. No.: 15/959,407

(22) Filed: Apr. 23, 2018

(65) Prior Publication Data

US 2019/0129193 A1    May 2, 2019

(30) Foreign Application Priority Data

Oct. 30, 2017    (KR) .................. 10-2017-0142193

(51) Int. Cl.
| G02B 27/22 | (2018.01) |
| H04N 13/106 | (2018.01) |
| H04N 13/366 | (2018.01) |
| H04N 13/305 | (2018.01) |

(52) U.S. Cl.
CPC ....... *G02B 27/2214* (2013.01); *H04N 13/106* (2018.05); *H04N 13/366* (2018.05)

(58) Field of Classification Search
CPC . G02B 27/2214; H04N 13/366; H04N 13/106
See application file for complete search history.

(56) References Cited

U.S. PATENT DOCUMENTS

| 6,302,541 B1 | 10/2001 | Grossmann |
| 2003/0048354 A1 | 3/2003 | Takemoto et al. |
| 2009/0123030 A1 | 5/2009 | De La Barre et al. |

FOREIGN PATENT DOCUMENTS

| CN | 102638690 A | 8/2012 |
| CN | 106575046 A | 4/2017 |
| JP | 2008-92075 A | 4/2008 |
| JP | 2013-143736 A | 7/2013 |
| JP | 2014-200060 A | 10/2014 |
| JP | 2016-505968 A | 2/2016 |
| JP | 2016-511853 A | 4/2016 |
| KR | 10-0913173 B1 | 8/2009 |
| KR | 10-2012-0054930 A | 5/2012 |
| KR | 10-2016-0051404 A | 5/2016 |
| KR | 10-2016-0068125 A | 6/2016 |
| TW | 2013-01862 A | 1/2013 |
| TW | 2014-07193 A | 2/2014 |
| WO | 2013/014786 A1 | 1/2013 |

*Primary Examiner* — Aneeta Yodichkas

(57) ABSTRACT

A hardware system for inputting a 3D image in a flat panel includes: a 3D image source input unit which is mounted on a 3D monitor equipped with a lenticular lens for transferring a left eye image and a right eye image on a front surface of an LCD panel, respectively, to viewer's left eye and right eye and receives a 3D image in a side by side form in which a left eye image and a right eye image are combined in parallel left and right from a 3D image reproducing device, which is externally connected to the 3D monitor, through an image input terminal; and a viewer position tracker which is mounted on the 3D monitor to track, in real time, a viewer's position from an image photographed by a camera photographing a front of the 3D monitor.

3 Claims, 8 Drawing Sheets

HARDWARE SYSTEM FOR INPUTTING 3D IMAGE IN FLAT PANEL

CROSS-REFERENCE TO RELATED APPLICATION(S)

This application claims the benefit of and priority to Korean Patent Application No. 10-2017-0142193, filed on Oct. 30, 2017, the content of which is incorporated herein by reference in its entirety.

BACKGROUND

1. Field

The present disclosure relates to a hardware system for inputting a 3D image in a flat panel, and more particularly, to a hardware system for inputting a stereoscopic image in a flat panel capable of inputting 3D image data output from a Blu-ray player or a console game device to a 3D monitor to enable the 3D monitor to display an auto-stereoscopic 3D image.

2. Description of Related Art

Since the success of Avatar (2009 film), three-dimensional (3D) video industries have emerged as new service models that have become popular in a variety of service industries ranging from movies, games, home entertainment, broadcasting, and smartphones.

In recent years, however, there have been evaluations that the 3D industries are not widespread as expected in part due to the inconvenience caused by wearing 3D glasses, visual fatigue issues, and limited volume of 3D contents.

In order to vitalize the 3D industries, it is necessary to be able to as easily acquire 3D contents as for 2D contents, to enjoy high-quality 3D images without glasses, and to reduce the fatigue of viewers.

In a way of fundamentally solving the visual fatigue issues, 3D video technologies adopting hologram may be developed. However, it will need more time to put it into practical use due to the massive amount of data, limits of physical devices, and the like.

On the other hand, development of service technologies using 3D images as an intermediate stage for enjoying the high-quality 3D images without glasses is being carried out globally around 3D-Television (3D-TV) manufacturers, academic entities, and research institutes, and international standardization is also in progress by, among others, MPEG (Moving Picture Experts Group).

Various Japanese manufactures, such as Sony Corporation and Toshiba Corporation, have focused their efforts on 3D-TV developments in order to regain lost TV market shares from Korean companies such as Samsung Electronics Co. Ltd. and LG Electronics Inc. In particular, various technologies and product developments are being attempted, one of which includes demonstration of an auto-stereoscopic 3D-TV prototype (which does not need glasses to watch stereoscopic 3D images) at the 2011 CES ("Consumer Electronics Show") which is distinguished from the current mainstream stereoscopic 3D-TV prototypes.

In Europe, 3D-related tasks have been carried out since the 1990s. In recent years, a consortium of 3D media clusters has been established to develop multi-view 3D image acquisition, generation, encoding, transmission, reproduction and display-related technologies such as 3D4YOU, MUSCADE and DIOMEDES and standardizations of a content format, encoding, a transmission technology, and the like are being carried out.

On the other hand, 3D monitors applied to the existing auto-stereoscopic multi-view 3D image output systems have been used only for display devices for 3D reproduction. Even if a 3D image source is provided, processing the 3D image source using a software program is carried out by a separate PC (personal computer) or an image processing device as shown in FIG. 8.

Figure 8:
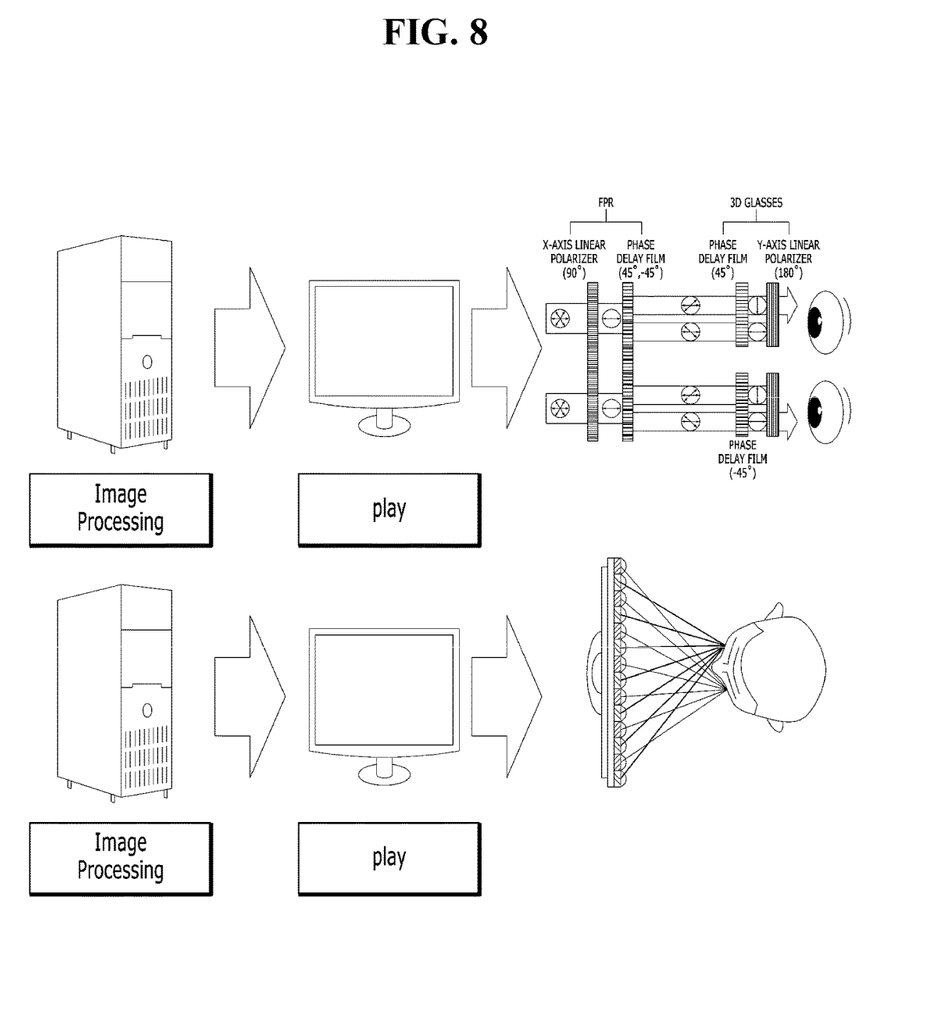
FIG. 8 is a flowchart illustrating a process of processing and displaying a 3D image in the existing auto-stereoscopic 3D image output system.

The conventional stereoscopic image implementation device shown in FIG. 8 shows a limited aspect of a passive display device. For this reason, there are limits on the implementation of the display in terms of manufacturing a 3D display panel and there is a problem in that a type of devices accessible to the 3D monitor is limited.

Therefore, it is impossible to use devices such as the Blu-ray player and the console game device that reproduces 3D sources without the separate PC or the image processing device even if the 3D monitor is provided.

As a result, not only the utilization of the 3D panel mounted on the 3D monitor is restricted, but also the accessibility to the existing auto-stereoscopic 3D image output system is also limited.

On the other hand, as the related art of the present disclosure, Korean Registered Patent No. 10-0913173 entitled "stereoscopic image display device" is filed and registered. The stereoscopic image display device disclosed in the Korean patent includes: a controller which receives a 3D graphic data and a synchronization signal to generate a control signal and output the control signal along with a 3D graphic data; a 3D graphic processor which generates a plurality of stereoscopic matrices for generating a multi-view 3D stereoscopic image data based on an input of a 3D activation signal and converts the 3D graphic data input from the controller into the 3D stereoscopic image data using the plurality of stereoscopic matrices; a driver which generates a driving signal based on an image data output from the 3D graphics processor and generates the driving signal based on the control signal output from the controller; and a display unit which displays an image corresponding to the image data based on the driving signal.

RELATED ART DOCUMENTS

Patent Documents (Patent Document 0001) Korean Patent No. 10-0913173 (Aug. 19, 2009)
(Patent Document 0002) Korean Patent Laid-open Publication No. 10-2016-0068125 (Jun. 15, 2016)

SUMMARY

An objective of embodiments disclosed herein is to provide a hardware system for inputting a stereoscopic image in a flat panel capable of inputting a 3D image to a 3D monitor without a separate PC or an image processing device to enable the 3D monitor to display an auto-stereoscopic 3D image.

According to an embodiment, a hardware system for inputting a 3D image in a flat panel according to the present disclosure may include: a 3D image source input unit which is mounted on a 3D monitor equipped with a lenticular lens for transferring a left eye image and a right eye image on a front surface of an LCD panel, respectively, to viewer's left eye and right eye and receives a 3D image in a side by side form in which a left eye image and a right eye image are combined in parallel left and right from a 3D image reproducing device, which is externally connected to the 3D monitor, through an image input terminal; a viewer position tracker which is mounted on the 3D monitor to track, in real time, a viewer's position from an image photographed by a camera photographing a front of the 3D monitor; and a 3D image processor which separates the left eye image and the right eye image from the 3D image in the side by side form which is input through the 3D image source input unit, cuts the separated left eye and right eye images in a slit form, alternately combines the cut left eye image and right eye image slits to generate one 3D image, transmits the generated 3D image to the LCD panel of the 3D monitor through a low voltage differential signaling (LVDS) interface to display the 3D image on the LCD panel, adjusts coordinates of pixels of the left eye image and right eye image slits displayed on the LCD panel of the 3D monitor according to position coordinates of the viewer tracked in real time by the viewer position tracker to allow the viewer to view the 3D image anywhere.

The hardware system for inputting stereoscopic images in a flat panel according to the embodiment with the above configuration may input the 3D image to the 3D monitor without the separate PC or the image processing device to enable the 3D monitor to display the auto-stereoscopic 3D image.

Accordingly, in the hardware system for inputting a 3D image in a flat panel according to the embodiment, the 3D image reproducing device which views the auto-stereoscopic 3D image, the PC or the image processing device which converts the 3D image output from the 3D image reproducing device into the auto-stereoscopic 3D image, and the 3D monitor which displays the 3D image output from the PC or the image processing device do not have to be complicatedly configured.

In addition, according to the embodiment, an application processing (AP) board is mounted on the 3D monitor instead of an A/D board of a flat panel in order to overcome the limitations of the conventional 3D display panel for displaying the auto-stereoscopic 3D image, and a separate 3D image input system is mounted on the AP board in order to overcome the limitations in the internal memory reproducing method.

In addition, according to the embodiment, the existing PC or external image processing device is removed and the AP board which converts the 3D image source input into the 3D monitor into the auto-stereoscopic 3D image is mounted, such that a wider 3D image reproducing device can be mounted on the 3D monitor.

In addition, the present disclosure provides the more effective stereoscopic image implementation method by reconstructing the stereoscopic image implementation method for the 3D display of the 3D monitor, and enhances the utilization of the stereoscopic flat panel, thereby improving the accessibility to other 3D reproducing devices.

DETAILED DESCRIPTION

Hereinafter, the present disclosure will be described in detail with reference to the accompanying drawings.

As shown in FIGS. 1 to 5, a hardware system for inputting a 3D image in a flat panel according to the embodiments disclosed herein may be configured to include: a 3D image source input unit 7 which is mounted on a 3D monitor 3 equipped with a lenticular lens 1 for transferring a left eye image and a right eye image on a front surface of an LCD panel, respectively, to a viewer's left eye and right eye and receives a 3D image in a side by side form in which a left eye image and a right eye image are combined in parallel left and right from a 3D image reproducing device, which is externally connected to the 3D monitor 3, through an image input terminal; a viewer position tracker 9 which is mounted on the 3D monitor 3 to track, in real time, a viewer's position from an image photographed by a camera photographing a front of the 3D monitor 3; and a 3D image processor 11 which separates the left eye image and the right eye image from the 3D image in the side by side form which is input through the 3D image source input unit 7, cuts the separated left eye and right eye images in a slit form, alternately combines the cut left eye image and right eye image slits to generate one 3D image, transmits the generated 3D image to the LCD panel of the 3D monitor 3 through a low voltage differential signaling (LVDS) interface to display the 3D image on the LCD panel, adjusts coordinates of pixels of the left eye mage and right eye image slits displayed on the LCD panel of the 3D monitor 3 according to position coordinates of the viewer tracked in real time by the viewer position tracker 9 to allow the viewer to view the 3D image anywhere.

Figure 1:
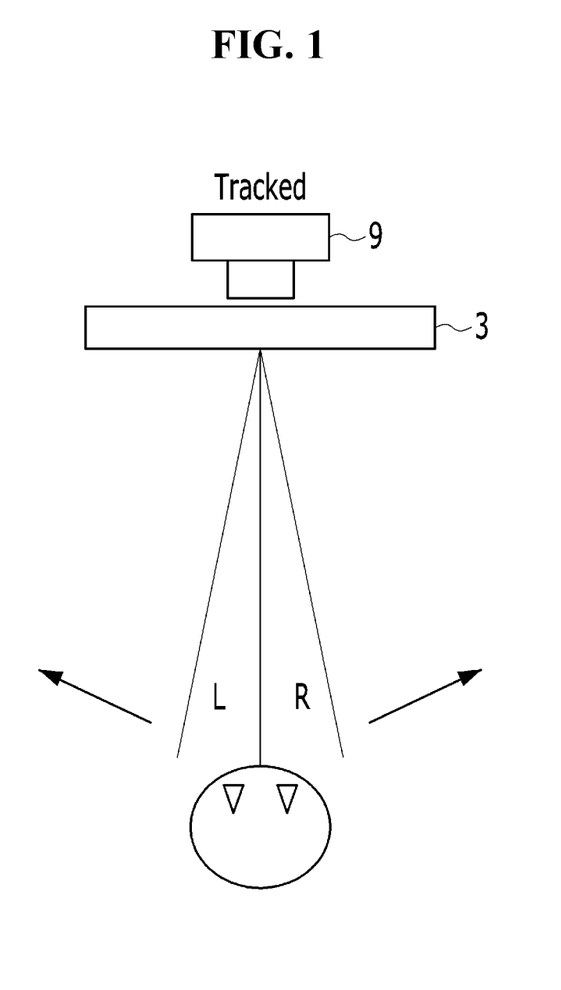
FIG. 1 is a conceptual diagram of the present disclosure.
Figure 5:
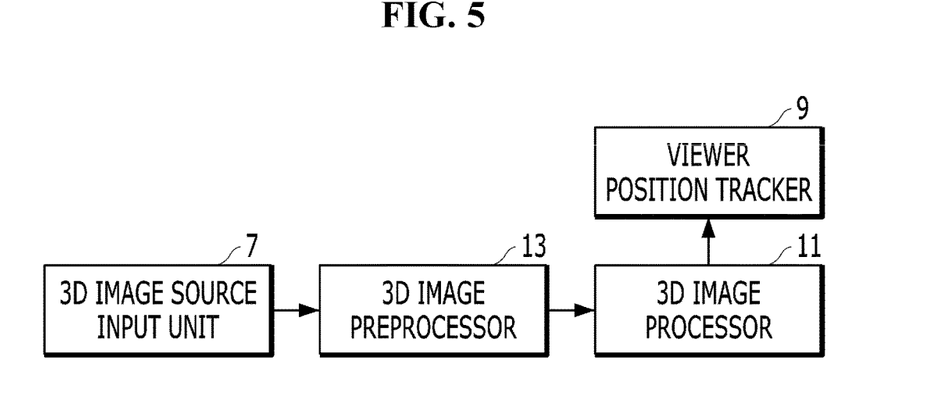
FIG. 5 is a control block diagram of the present disclosure.

The viewer position tracker 9 tracks in real time a whole body of the viewer, a face of the viewer, or a binocular position coordinates from the image photographed by the camera which photographs the front of the 3D monitor 3.

Figure 2:
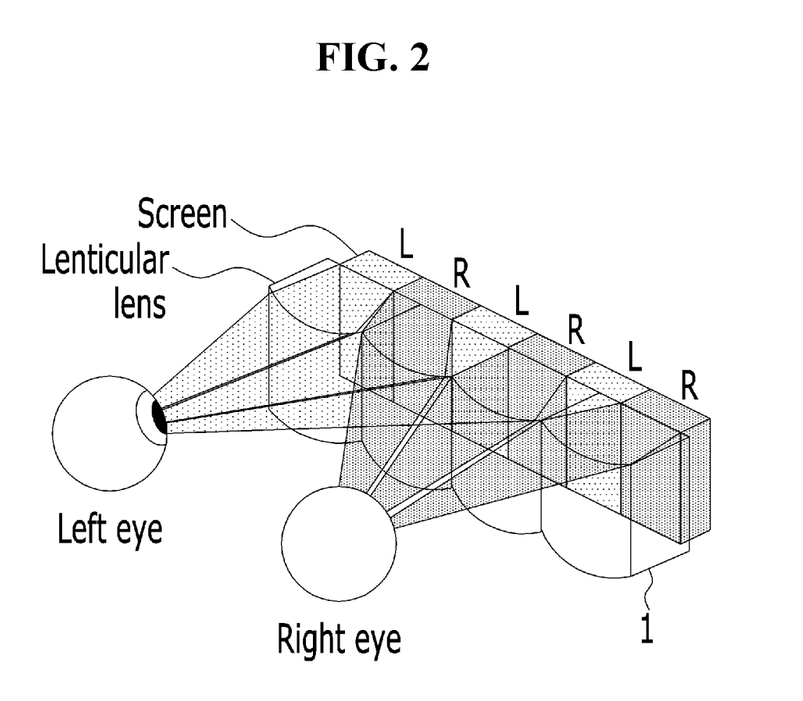
FIG. 2 illustrates that through a lenticular lens, a left eye looks at a left eye image and a right eye looks at a right eye image, and finally a viewer's brain recognizes a 3D image.
Figure 3:
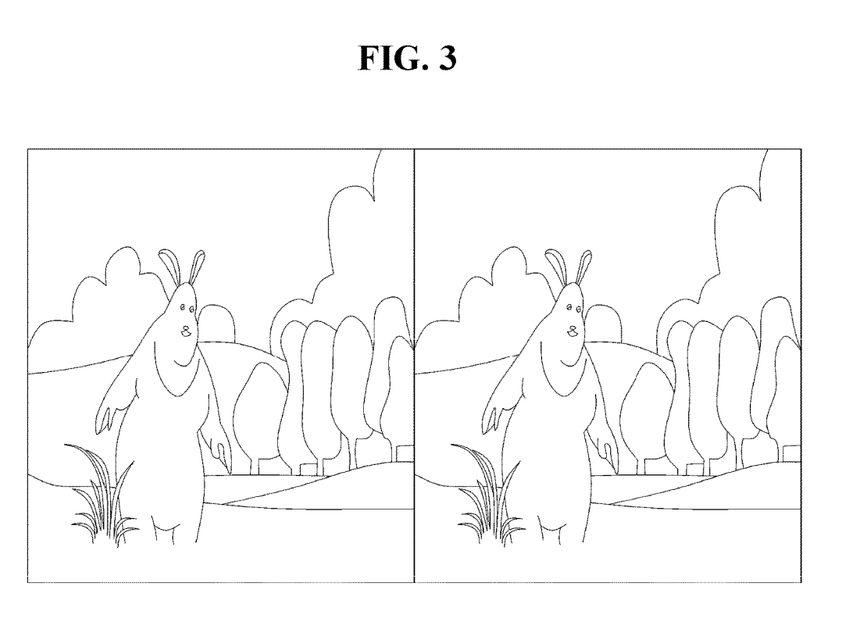
FIG. 3 is a diagram showing a side-by-side image in which a left eye image and a right eye image are combined into one.
Figure 4:
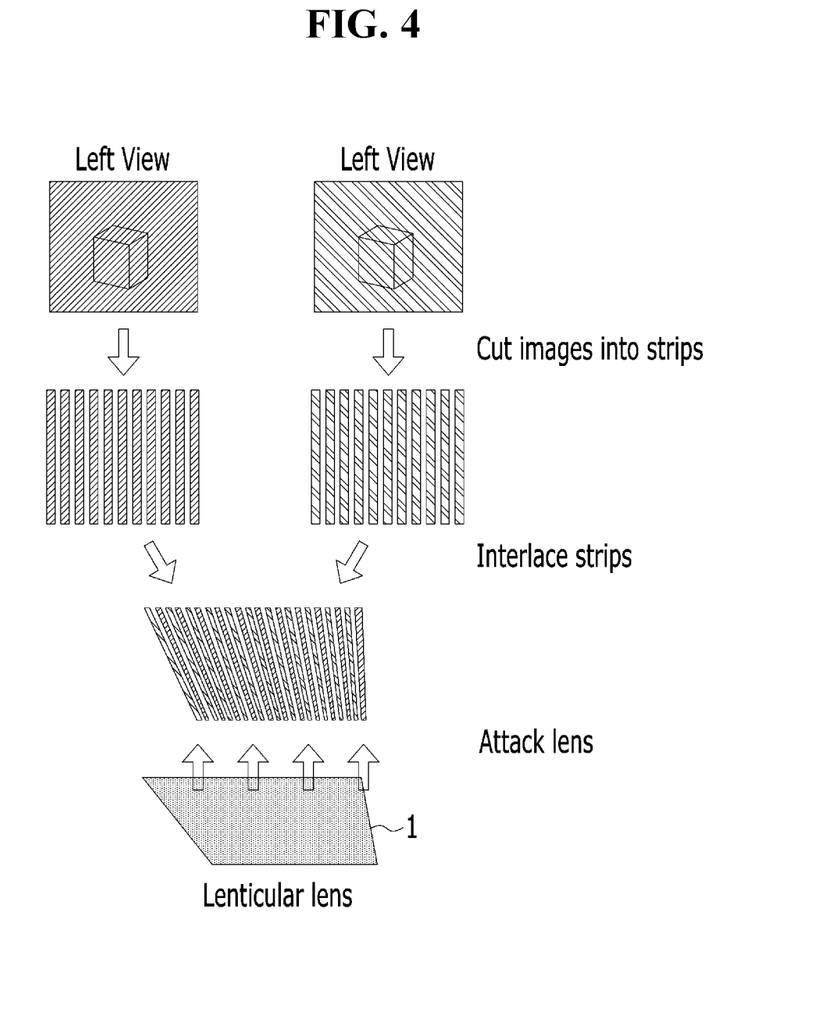
FIG. 4 is a flowchart illustrating a processing of constructing a 3D image using the side-by-side image.

As shown in FIG. 2, the left eye of the viewer looks at the left eye image generated by combining left eye image slits into one by the lenticular lens 1, and the right eye of the viewer looks at the right eye image generated by combining the right eye image slits into one by the lenticular lens 1.

In addition, when the left eye image and the right eye image are each input into the left eye and the right eye, the viewer's brain senses a 3D effect on an object included in the left eye image and the right eye image.

In addition, the 3D image processor 11 finely adjusts the left eye image slit and the right eye image slit to the left or right direction of the 3D monitor 3 according to the position coordinates of the viewer, such that the viewer can view the 3D image anywhere.

The 3D image source input unit 7 receives a 3D image from a 3D image reproducing device through a high definition multimedia interface (HDMI).

In addition, the hardware system according to the present disclosure further includes a 3D image preprocessor 13 which checks whether or not the 3D image data input from the 3D image source input unit 7 is replicated; if the input 3D image data is not replicated, separates an audio signal include in the 3D image data from the 3D image; corrects the 3D image for enhancing resolution of the separated 3D image; adjusts a size of the corrected 3D image; and transmits the resized 3D image to the 3D image processor 11.

Figure 6:
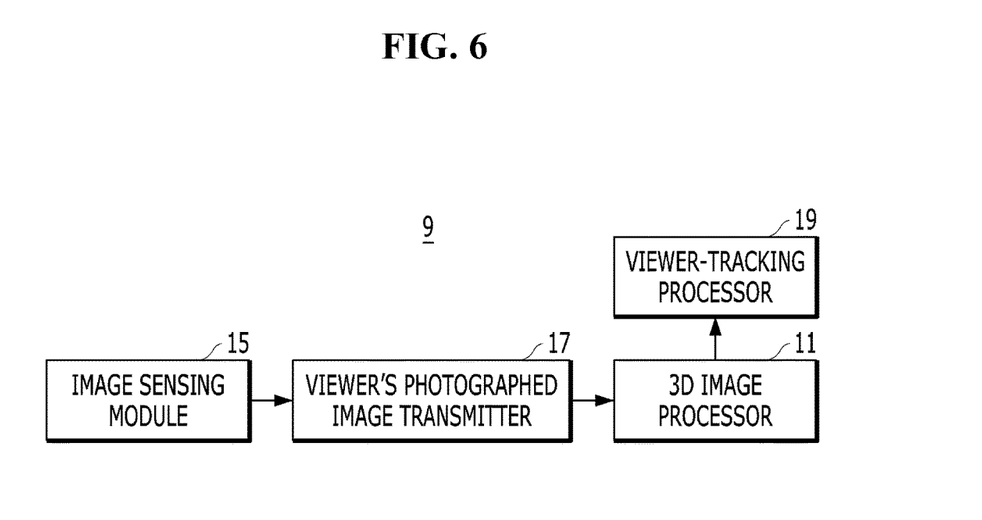
FIG. 6 is a control block diagram of a viewer position tracker.

As shown in FIG. 6, the viewer position tracker 9 may be configured to include: an image sensing module 15 which photographs a viewer who watches the 3D monitor 3 and then generates the photographed image of the viewer, a viewer's photographed image transmitter 17 which transmits the image photographed by the image sensing module 15 to the 3D image processor 11 through a mobile industry processor interface (MIPI) and a camera serial interface-1 (CSI-1); and a viewer-tracking processor 19 which tracks the position coordinates of the viewer in the photographed image of the viewer input to the 3D image processor 11.

The viewer-tracking processor 19 tracks in real time the whole body of the viewer, the face of the viewer, or the binocular position coordinates from the photographed image of the viewer input to the 3D image processor 11.

Figure 7:
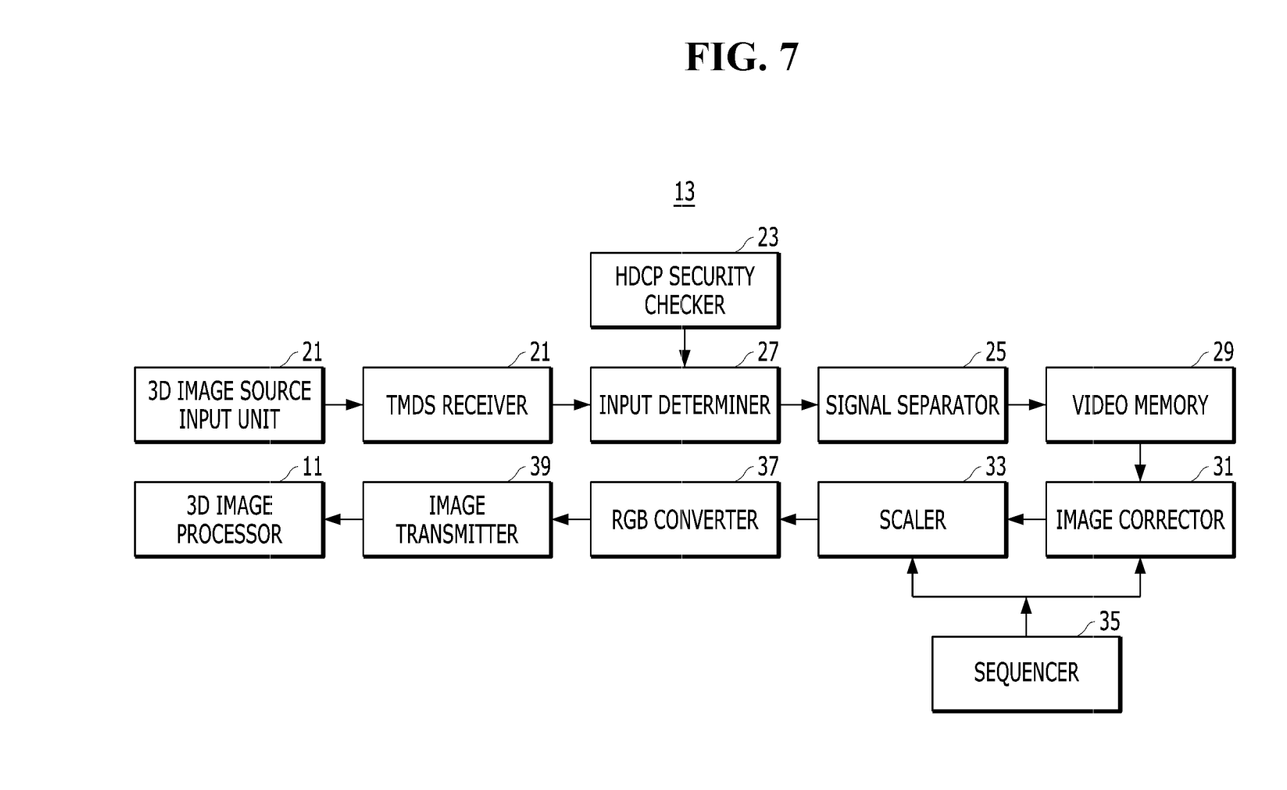
FIG. 7 is a control block diagram of the 3D image preprocessor.

As shown in FIG. 7, the 3D image preprocessor 13 may be configured to include: a transition minimized differential signaling (TMDS) receiver 21 which receives a 3D image signal and an audio signal from the 3D image source input unit 7; an high-bandwidth digital content protection (HDCP) security checker 23 which checks whether or not the 3D image data input through the TMDS receiver 21 is replicated; an input determiner 27 which receives the 3D image signal and the audio signal and transmits the received 3D image signal and audio signal to the signal separator 25 if the 3D image data input through the TMDS receiver 21 is not replicated as a result of checking whether the 3D image data is replicated by the HDCP security checker 23; a signal separator 25 which separates the 3D image data and the audio data input through the input determiner 27 and converts an RGB image format of the separated 3D image data into a YUV image format; a video memory 29 which stores the 3D image data of the YUV image format separated by the signal separator 25 in a first in first out (FIFO) manner; an image corrector 31 which corrects the 3D image data of the YUV image format stored in the video memory 29 to increase the resolution of the 3D image; a scaler 33 which adjusts the 3D image size of the YUV image format stored in the video memory 29; a sequencer 35 which sequentially operates the image corrector 31 and the scaler 33; a red-green-blue (RGB) converter 37 which converts the 3D image of the YUV image format whose size is adjusted and resolution is enhanced by the image corrector 31 and the scaler 33 into the 3D image of the RGB image format; and an image transmitter 39 which transmits the 3D image data of the RGB image format output from the RGB converter 37 to the 3D image processor 11 through a camera serial interface (CSI2).

In addition, the 3D image preprocessor 13 further includes a memory unit 41 which stores a register file of the 3D monitor 3 and extended display identification data (EDID) information of the 3D monitor 3.

The hardware system for inputting stereoscopic images in a flat panel according to the present disclosure having the above configuration may input the 3D image to the 3D monitor 3 without the separate PC or the image processing device to enable the 3D monitor 3 to display the auto-stereoscopic 3D image.

Accordingly, in the hardware system for inputting a 3D image in a flat panel according to the present disclosure, the 3D image reproducing device which views the auto-stereoscopic 3D image, the PC or the image processing device which converts the 3D image output from the 3D image reproducing device into the auto-stereoscopic 3D image, and the 3D monitor 3 which displays the 3D image output from the PC or the image processing device do not have to be complicatedly configured.

In addition, according to the present disclosure, an application processing (AP) board is mounted on the 3D monitor 3 instead of an A/D board of a flat panel in order to overcome the limitations of the conventional 3D display panel for displaying the auto-stereoscopic 3D image, and a separate 3D image input system is mounted on the AP board in order to overcome the limitations in the internal memory reproducing method.

In addition, according to the present disclosure, the existing PC or external image processing device is removed and the AP board which converts the 3D image source input into the 3D monitor 3 into the auto-stereoscopic 3D image is mounted, such that a wider 3D image reproducing device can be mounted on the 3D monitor 3.

In addition, the present disclosure provides the more effective stereoscopic image implementation method by reconstructing the stereoscopic image implementation method for the 3D display of the 3D monitor 3, and enhances the utilization of the stereoscopic flat panel, thereby improving the accessibility to other 3D reproducing devices.

What is claimed is:

1. A hardware system for inputting a three-dimensional (3D) image in a flat panel, comprising:
    a 3D image source input unit which is mounted on a 3D monitor equipped with a lenticular lens for transferring a left eye image and a right eye image on a front surface of an LCD panel, respectively, to viewer's left eye and right eye and receives a 3D image in a side by side form in which a left eye image and a right eye image are combined in parallel left and right from a 3D image reproducing device, which is externally connected to the 3D monitor, through an image input terminal;
    a viewer position tracker which is mounted on the 3D monitor to track, in real time, a viewer's position from an image photographed by a camera photographing a front of the 3D monitor;
    a 3D image processor which separates the left eye image and the right eye image from the 3D image in the side by side form which is input through the 3D image source input unit, cuts the separated left eye and right eye images in a slit form, alternately combines the cut left eye image and right eye image slits to generate one 3D image, transmits the generated 3D image to the LCD panel of the 3D monitor through a low voltage differential signaling (LVDS) interface to display the 3D image on the LCD panel, adjusts coordinates of pixels of the left eye image and right eye image slits displayed on the LCD panel of the 3D monitor according to position coordinates of the viewer tracked in real time by the viewer position tracker to allow the viewer to view the 3D image anywhere; and
    a 3D image preprocessor which checks whether or not the 3D image data input from the 3D image source input unit is replicated, if the input 3D image data is not replicated, separates an audio signal included in the 3D image data from the 3D image, corrects the 3D image for enhancing resolution of the separated 3D image, adjusts a size of the corrected 3D image, and transmits the resized 3D image to the 3D image processor.

2. The hardware system of claim 1, wherein the viewer position tracker includes:
   an image sensing module which photographs a viewer who watches the 3D monitor and then generates the photographed image of the viewer;
   a viewer's photographed image transmitter which transmits the image photographed by the image sensing module to the 3D image processor through a mobile industry processor interface (MIPI) and a camera serial interface-1 (CSI-1); and
   a viewer-tracking processor which tracks the position coordinates of the viewer in the photographed image of the viewer input to the 3D image processor.

3. The hardware system of claim 1, wherein the viewer position tracker tracks in real time a whole body of the viewer, a face of the viewer, or a binocular position coordinates from the image photographed by the camera which photographs the front of the 3D monitor.

* * * * *